US009998536B2

(12) United States Patent
Mani et al.

(10) Patent No.: US 9,998,536 B2
(45) Date of Patent: Jun. 12, 2018

(54) METERED NETWORK SYNCHRONIZATION

(71) Applicant: Microsoft Corporation, Redmond, WA (US)

(72) Inventors: Varun Ramesh Mani, Redmond, WA (US); Haohui Yin, Bellevue, WA (US); Scott E. Dart, Bellevue, WA (US); Benjamin N. Truelove, Lynnwood, WA (US); Benjamin Salim Srour, Seattle, WA (US); Swagat Dasgupta, Redmond, WA (US); Joerg C. Zender, Renton, WA (US); MerryJane M. Fosdick, Kirkland, WA (US); Oded Y. Shekel, Bellevue, WA (US); Andrew J. Koltz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 549 days.

(21) Appl. No.: 13/905,091

(22) Filed: May 29, 2013

(65) Prior Publication Data
US 2014/0359056 A1    Dec. 4, 2014

(51) Int. Cl.
*H04L 29/08* (2006.01)
*G06F 11/14* (2006.01)
*G06F 17/30* (2006.01)

(52) U.S. Cl.
CPC ...... *H04L 67/1095* (2013.01); *G06F 11/1448* (2013.01); *G06F 11/1461* (2013.01); *G06F 17/30067* (2013.01)

(58) Field of Classification Search
CPC ............ H04L 67/1095; G06F 11/1448; G06F 11/1461; G06F 17/30067
See application file for complete search history.

(56) References Cited

U.S. PATENT DOCUMENTS

| 5,485,455 | A | 1/1996 | Dobbins et al. |
| 5,491,694 | A | 2/1996 | Oliver et al. |
| 5,521,910 | A | 5/1996 | Matthews |
| 5,790,546 | A | 8/1998 | Dobbins et al. |
| 6,101,170 | A | 8/2000 | Doherty et al. |

(Continued)

FOREIGN PATENT DOCUMENTS

| CN | 101401391 A | 4/2009 |
| CN | 101631124 | 1/2010 |

(Continued)

OTHER PUBLICATIONS

Chao Li, "Method and device for downloading data", Jan. 20, 2010, ProQuest translation of CN101631124 obtained Apr. 6, 2015.*

(Continued)

*Primary Examiner* — Aaron Strange
(74) *Attorney, Agent, or Firm* — Rainier Patents, P.S.

(57) ABSTRACT

Metered network synchronization techniques are described. A current network connection of a computing device is checked as to whether the current network connection has been identified as a metered network. Access by a synchronization engine of the computing device to communicate via the current network connection to synchronize data of the computing device with another computing device is managed based at least in part on a setting associated with the metered network.

20 Claims, 8 Drawing Sheets

(56) References Cited

U.S. PATENT DOCUMENTS

| | | | |
|---|---|---|---|
| 6,111,909 A * | 8/2000 | Taki | H04B 1/7143 370/312 |
| 6,650,639 B2 | 11/2003 | Doherty et al. | |
| 7,075,536 B1 | 7/2006 | Goldschmidt | |
| 7,747,785 B2 | 6/2010 | Baker, III et al. | |
| 7,814,195 B2 * | 10/2010 | Dacosta | H04L 29/06027 370/466 |
| 8,325,627 B2 | 12/2012 | Pratt, Jr. et al. | |
| 8,347,386 B2 | 1/2013 | Mahaffey et al. | |
| 8,406,248 B2 | 3/2013 | Pratt, Jr. et al. | |
| 8,478,233 B2 | 7/2013 | Liu et al. | |
| 8,504,781 B2 | 8/2013 | Ido | |
| 8,566,297 B1 * | 10/2013 | Dowers, II | G06F 17/30073 707/703 |
| 9,684,563 B1 * | 6/2017 | Wartnick | G06F 11/1451 |
| 2002/0107877 A1 | 8/2002 | Whiting et al. | |
| 2003/0061179 A1 | 3/2003 | Reece | |
| 2004/0111725 A1 | 6/2004 | Srinivasan et al. | |
| 2006/0015636 A1 | 1/2006 | Skraba et al. | |
| 2006/0036890 A1 * | 2/2006 | Henrickson | G06F 11/1469 714/2 |
| 2006/0112427 A1 * | 5/2006 | Shahbazi | G06F 21/50 726/16 |
| 2007/0033530 A1 | 2/2007 | Motoyama et al. | |
| 2007/0238440 A1 * | 10/2007 | Sengupta | G06F 1/3209 455/343.2 |
| 2008/0046377 A1 | 2/2008 | Major et al. | |
| 2008/0049714 A1 * | 2/2008 | Commarford | G06Q 20/105 370/350 |
| 2008/0065835 A1 | 3/2008 | Iacobovici et al. | |
| 2008/0115141 A1 * | 5/2008 | Welingkar | G06F 9/5011 718/104 |
| 2008/0167033 A1 * | 7/2008 | Beckers | 455/432.3 |
| 2008/0200154 A1 | 8/2008 | Maharajh et al. | |
| 2008/0201724 A1 * | 8/2008 | Endrikhovski | G06F 3/04847 719/318 |
| 2008/0250024 A1 | 10/2008 | Kvm et al. | |
| 2010/0011090 A1 | 1/2010 | Gordon | |
| 2010/0030785 A1 | 2/2010 | Wilson et al. | |
| 2010/0046543 A1 * | 2/2010 | Parnaby | H04L 12/12 370/465 |
| 2010/0141400 A1 * | 6/2010 | Radulescu | H04W 52/0225 340/10.33 |
| 2010/0151851 A1 | 6/2010 | Bhatia et al. | |
| 2011/0047594 A1 | 2/2011 | Mahaffey et al. | |
| 2011/0047597 A1 | 2/2011 | Mahaffey et al. | |
| 2011/0047620 A1 | 2/2011 | Mahaffey et al. | |
| 2011/0131321 A1 | 6/2011 | Black et al. | |
| 2011/0145920 A1 | 6/2011 | Mahaffey et al. | |
| 2012/0047201 A1 | 2/2012 | Jain | |
| 2012/0108206 A1 * | 5/2012 | Haggerty | 455/411 |
| 2012/0110174 A1 | 5/2012 | Wootton et al. | |
| 2012/0174212 A1 * | 7/2012 | Dart | G06F 9/44505 726/19 |
| 2012/0240236 A1 | 9/2012 | Wyatt et al. | |
| 2012/0290640 A1 | 11/2012 | Mahaffey et al. | |
| 2012/0326883 A1 | 12/2012 | Angelis et al. | |
| 2013/0035059 A1 | 2/2013 | Liu et al. | |
| 2013/0067061 A1 * | 3/2013 | Khalid et al. | 709/224 |
| 2013/0097416 A1 * | 4/2013 | Barra | G06F 9/4451 713/100 |
| 2013/0151658 A1 * | 6/2013 | Baker | H04L 67/1095 709/217 |
| 2014/0024339 A1 * | 1/2014 | Dabbiere et al. | 455/406 |
| 2014/0068212 A1 * | 3/2014 | Lin | H04M 15/58 711/162 |
| 2014/0071290 A1 * | 3/2014 | Collen | H04N 9/79 348/159 |
| 2014/0101103 A1 * | 4/2014 | Chan et al. | 707/634 |
| 2014/0201512 A1 * | 7/2014 | Seethaler | G06F 9/4406 713/2 |
| 2014/0359056 A1 | 12/2014 | Mani et al. | |
| 2015/0358406 A1 * | 12/2015 | Scheer | H04L 67/1095 709/248 |
| 2016/0212211 A1 * | 7/2016 | Micucci | H04L 67/02 |

FOREIGN PATENT DOCUMENTS

| | | |
|---|---|---|
| EP | 1338968 A2 | 8/2003 |
| JP | 2007065944 A | 3/2007 |
| JP | 2009-135728 A | 6/2009 |
| KR | 20050061902 | 6/2005 |
| WO | WO-2010128391 | 11/2010 |
| WO | 2011014558 A2 | 2/2011 |

OTHER PUBLICATIONS

"Foreign Office Action", CN Application No. 201210331105.6, dated Sep. 2, 2014, 14 pages.

"Examiner's Answer to Appeal Brief", U.S. Appl. No. 13/229,499, dated Oct. 22, 2014, 5 pages.

"International Search Report & Written Opinion for PCT Application No. PCT/US2013/058668", dated Mar. 12, 2014, Filed Date: Sep. 9, 2013, 9 Pages.

"Final Office Action", U.S. Appl. No. 13/229,499, dated Jan. 31, 2014, 7 pages.

"Extended European Search Report", EP Application No. 11872093.7, Mar. 19, 2015, 7 pages.

"Foreign Office Action", CN Application No. 201210331105.6, Feb. 28, 2015, 9 pages.

"Remote Backup in the Cloud", Retrieved at <<http://www.edtechmagazine.com/higher/sites/edtechnnagazine.com.higher/files/remote-backup-in-the-cloud.pdf>>, In the White Paper of CDW, Retrieved Date: Mar. 4, 2013, pp. 8.

Verboon, Alex, "Windows 8—Metered Connections", Retrieved at <<http://www.verboon.info/index.php/2012/10/windows-8metered-connections/>>, Oct. 17, 2012, pp. 8.

Tu, Hoang, [Windows 8] How to Decrease Data or Bandwidth Usage (by Using 'Metered Connection'), and How to Turn on 'Airplane Mode', Retrieved at <<http://dottech.org/88703/windows-8-how-to-minimize-data-or-bandwidth-usage-by-using-metered-connection-and-how-to-turn-on-airplane-mode/, Nov. 28, 2012, :pp. 7.

"Quickstart: Managing Metered Network Cost Constraints (Windows)", Retrieved at <<http://msdn.microsoft.com/en-in/library/windows/apps/hh750310.aspx>>, Retrieved Date: Mar. 4, 2013, pp. 7.

"Managing Network Usage", Retrieved at <<http://developer.android.com/training/basics/network-ops/managing.html>>, Retrieved Date: Mar. 4, 2013, pp. 7.

"International Search Report and Written Opinion", Application No. PCT/US2011/055694, (dated Sep. 20, 2012), 9 pages.

"Non-Final Office Action", U.S. Appl. No. 13/229,499, (dated Mar. 25, 2013), 4 Pages.

"Non-Final Office Action", U.S. Appl. No. 13/229,499, (dated Oct. 11, 2013), 6 pages.

"Restriction Requirement", U.S. Appl. No. 13/229,499, (dated Feb. 7, 2013), 5 pages.

Lu, Yung-Hsiang et al., "Requester-Aware Power Reduction", *IEEE*, available at http://www.google.co.in/url?sa=t&source=web&cd=4&sqi=2&ved=0CDIQFjAD& url=http%3A%2F%2Fciteseerx.ist.psu.ed%2Fviewdoc%2Fdownload%3Fdoi%3D10.1.1.16.8421%26rep%3Drep1%26type%3Dpdf&rct=j&q=API%20for%22power-friendly%22%20downloads%20and&ei=Bcl,(2000), pp. 18-23.

International Report on Patentability dated Dec. 1, 2015 from PCT Patent Application No. PCT/US2013/058668, 7 pages.

International Report on Patentability dated Mar. 12, 2014 from PCT Patent Application No. PCT/US2011/055694, 5 pages.

Response filed Nov. 13, 2014 to the First Office Action dated Sep. 2, 2014 from China Patent Application No. 201210331105.6, 7 pages.

(56) References Cited

OTHER PUBLICATIONS

Response filed May 13, 2015 to the Second Office Action dated Feb. 28, 2015 from China Patent Application No. 201210331105.6, 3 pages.
Decision on Rejection dated Sep. 6, 2015 from China Patent Application No. 201210331105.6, 10 pages.
Response filed Dec. 4, 2015 to the Decision on Rejection dated Sep. 6, 2015 from China Patent Application No. 201210331105.6, 8 pages.
Response filed Oct. 13, 2015 to the Extended European Search Report dated Mar. 19, 2015 from European Application No. 11872093.7, 10 pages.
Office Action dated Aug. 4, 2015 from Japan Patent Application No. 2014-529681, 6 pages.
Response filed Oct. 13, 2015 to the Office Action dated Aug. 4, 2015 from Japan Patent Application No. 2014-529681, 8 pages.
Response filed Mar. 8, 2013 to the Restriction/Election dated Feb. 7, 2013 from U.S. Appl. No. 13/229,499, 7 pages.
Response filed Jun. 6, 2013 to the Non-Final Office Action dated Mar. 25, 2013 from U.S. Appl. No. 13/229,499, 13 pages.
Response filed Jan. 10, 2014 to the Non-Final Office Action dated Oct. 11, 2013 from U.S. Appl. No. 13/229,499, 14 pages.
Final Office Action dated Jan. 31, 2014 from U.S. Appl. No. 13/229,499, 7 pages.
Notice of Appeal filed Apr. 30, 2014 from U.S. Appl. No. 13/229,499, 2 pages.
Notice of Panel Decision from Pre-Appeal Brief Review dated Jul. 1, 2014 from U.S. Appl. No. 13/229,499, 7 pages.
Appeal Brief filed Sep. 2, 2014 from U.S. Appl. No. 13/229,499, 27 pages.
Amendment filed Dec. 3, 2015 from U.S. Appl. No. 13/229,499, 8 pages.
Dismissal of Appeal dated Dec. 9, 2015 from U.S. Appl. No. 13/229,499, 2 pages.
Notice of Allowance and Examiner Initiated Interview Summary dated Jan. 14, 2016 from U.S. Appl. No. 13/229,499, 19 pages.
Preliminary Amendment filed May 13, 2016 from U.S. Appl. No. 15/149,992, 6 pages.
Non-Final Office Action dated Aug. 26, 2016 from U.S. Appl. No. 15/149,992, 20 pages.
Supplemental Notice of Allowability dated Apr. 1, 2016 from U.S. Appl. No. 13/229,499, 6 pages.
Supplemental Notice of Allowability dated Apr. 18, 2016 from U.S. Appl. No. 13/229,499, 6 pages.
Supplemental Notice of Allowability dated Apr. 20, 2016 from U.S. Appl. No. 13/229,499, 6 pages.
Notice to Grant dated Aug. 8, 2016 from Chinese Patent Application No. 201210331105.6, 6 pages.
Reexamination Decision dated Mar. 29, 2016 from Chinese Patent Application No. 201210331105.6, 2 pages.
Third Office Action dated May 9, 2016 from Chinese Patent Application No. 201210331105.6, 4 pages.
Response filed May 27, 2016 to the Third Office Action dated May 8, 2016 from Chinese Patent Application No. 201210331105.6, 9 pages.
Intention to Grant dated Sep. 1, 2016 from European Patent Application No. 11872093.7, 40 pages.
Communication pursuant to Rules 161(1) and 162 EPC dated Jan. 22, 2016 from European Patent Application No. 13770541.4, 2 pages.
Response filed Aug. 1, 2016 to the Communication pursuant to Rules 161(1) and 162 EPC dated Jan. 22, 2016 from European Patent Application No. 13770541.4, 13 pages.
Response filed Nov. 23, 2016 to the Non-Final Office Action dated Aug. 26, 2016 from U.S. Appl. No. 15/149,992, 7 pages.
Terminal Disclosure and Approval filed Nov. 23, 2016 from U.S. Appl. No. 15/149,992, 3 pages.
Request for Examination and Voluntary Amendment filed Sep. 26, 2016 from Korean Patent Application No. 10-2014-7006194, 18 pages.
Office Action dated Mar. 8, 2016 from Japanese Patent Application No. 2014-529681, 4 pages.
Notice of Allowance dated Feb. 7, 2017 from U.S. Appl. No. 15/149,992, 21 pages.
"Extended European Search Report", EP Application No. 11872093.7, dated Mar. 19, 2015, 7 pages.
"Foreign Office Action", CN Application No. 201210331105.6, dated Feb. 28, 2015, 9 pages.
Decision to Grant dated Feb. 2, 2017 from European Patent Application No. 11872093.7, 2 pages.
First Office Action dated Apr. 3, 2018 from Chinese Patent Application Publication 20130076997.2, 6 pages.

\* cited by examiner

METERED NETWORK SYNCHRONIZATION

BACKGROUND

Users have access to an ever increasing variety of computing devices, from desktop PCs and laptops to tablets and mobile phones. These computing devices may be configured in a variety of ways to support a variety of different techniques to access a network. Accordingly, the way in which these devices may access a network may vary based on a device type. However, a particular situation in which the computing device is utilized to access the network may also have an effect on usage of the device.

For example, a user of a laptop computer may leverage a wired connection in an office to access a network that does not have limit the bandwidth made available to the laptop. However, in other situations (such as a hotel) limits may be set on the access to the network that is made available to the laptop. Conventional techniques that were utilized to manage access to the network by the laptop itself, however, did not address these situations and thus may result in inefficient utilization of the network.

SUMMARY

Metered network synchronization techniques are described. A current network connection of a computing device is checked as to whether the current network connection has been identified as a metered network. Access by a synchronization engine of the computing device to communicate via the current network connection to synchronize data of the computing device with another computing device is managed based at least in part on a setting associated with the metered network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
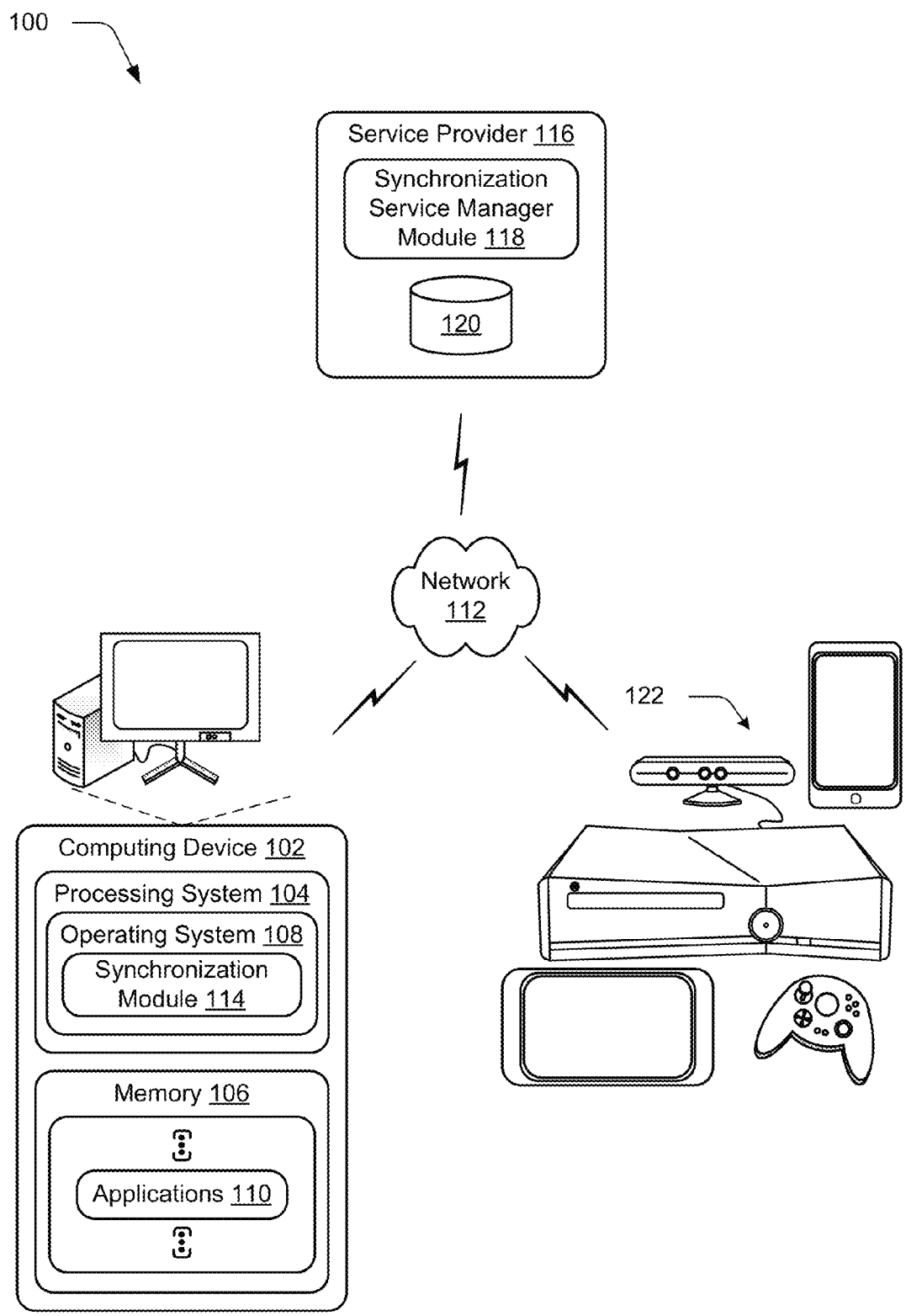
FIG. 1 is an illustration of an environment in an example implementation that is operable to implement techniques described herein.

Network usage is a primary part of the ever increasing functionality supported by a computing device. For example, a computing device may be configured to perform automatic backups of data of the computing device to protect this data from corruption and loss. However, situations may be encountered in which this backup may interfere with the overall operation of the computing device.

For instance, the computing device may be connected to a metered network and thus limitations may be encountered as part of access to the network. This may include bandwidth limitations, limitations of an overall amount of data that may be transferred, costs per communication, and so on. Therefore, such situations may make backup of the data undesirable as it may interfere with other functionality of the computing device (may consume a large part of the overall bandwidth that is available to the device), may consume available resources that are limited, and so on.

Metered network connection techniques are described. In one or more implementations, a computing device may manage access that addresses whether a current network connection is identified as a metered network. For example, a user interface may be configured such that a user may manually identify a network connection as a metered network, such as a hotel connection, airport connection, mobile broadband access, and so on. This identification may also be performed automatically and without user intervention, such as to identify a particular device as associated with a metered network, such as a mobile broadband network.

A user may then specify settings that are to be used in such situations of an identified metered network to manage access to the network. For example, the settings may specify that access is or is not permitted to particular metered networks, throttling to be performed, access that is permitted if the metered access is also identified as a roaming metered network, and so on. In this way, a user may specify how access to the metered networks is to be managed to synchronize data of the computing device. Continuing with the previous example, the computing device may include a backup synchronization engine and use these settings to manage access of this engine to the metered network. Other settings may also be specified for other synchronization engines, such as a settings synchronization engine, a file synchronization engine, and so on. Thus, each of these engines may have settings set for that engine in particular to manage access. A variety of other examples are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ synchronization techniques described herein. The illustrated environment 100 includes a computing device 102 having a processing system 104 and a computer-readable storage medium that is illustrated as a memory 106 although other confirmations are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is further illustrated as including an operating system 108. The operating system 108 is configured to abstract underlying functionality of the computing device 102 to applications 110 that are executable on the computing device 102. For example, the operating system 108 may abstract the processing system 104, memory 106, network 112, and/or display device functionality of the computing device 102 such that the applications 110 may be written without knowing "how" this underlying functionality is implemented. The application 110, for instance, may provide data to the operating system 108 to be rendered and displayed by the illustrated display device without understanding how this rendering will be performed. The operating system 108 may also represent a variety of other functionality, such as to manage a file system and user interface that is navigable by a user of the computing device 102.

The operating system 108 is also illustrated as including a synchronization module 114. The synchronization module 114 is representative of functionality to synchronize data of the computing device 102 with another device, such as a service provider 116 via the network 112. Although illustrated as part of the operating system 106, the synchronization module 114 may be implemented in a variety of other ways, such as a standalone module, part of one of the applications 110, and so on.

The service provider 116 is illustrated as including a synchronization service manager module 118 that is representative of functionality to synchronize data of the computing device 102 with storage 120 of computing devices that are used to implement the service provider 116 (e.g., servers of a server farm) and/or other computing devices 122. The synchronization service manager module 118, for instance, may utilize the storage 120 to support data storage "over the cloud" as part of the service provider 116. The synchronization service manager module 118 may also be configured to automatically synchronize this data with other computing devices 122, such as those devices associated with a user's account. In this way, data may be synchronized and "roamed" between the computing device 102, storage 120, and other computing devices 122. A variety of different types of data may be synchronized, further discussion of which is described as follows and shown in a corresponding FIG. 2.

Generally, any of the functions described herein can be implemented using software, firmware, hardware (e.g., fixed logic circuitry), or a combination of these implementations. The terms "module," "functionality," and "engine" as used herein generally represent software, firmware, hardware, or a combination thereof. In the case of a software implementation, the module, functionality, or engine represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
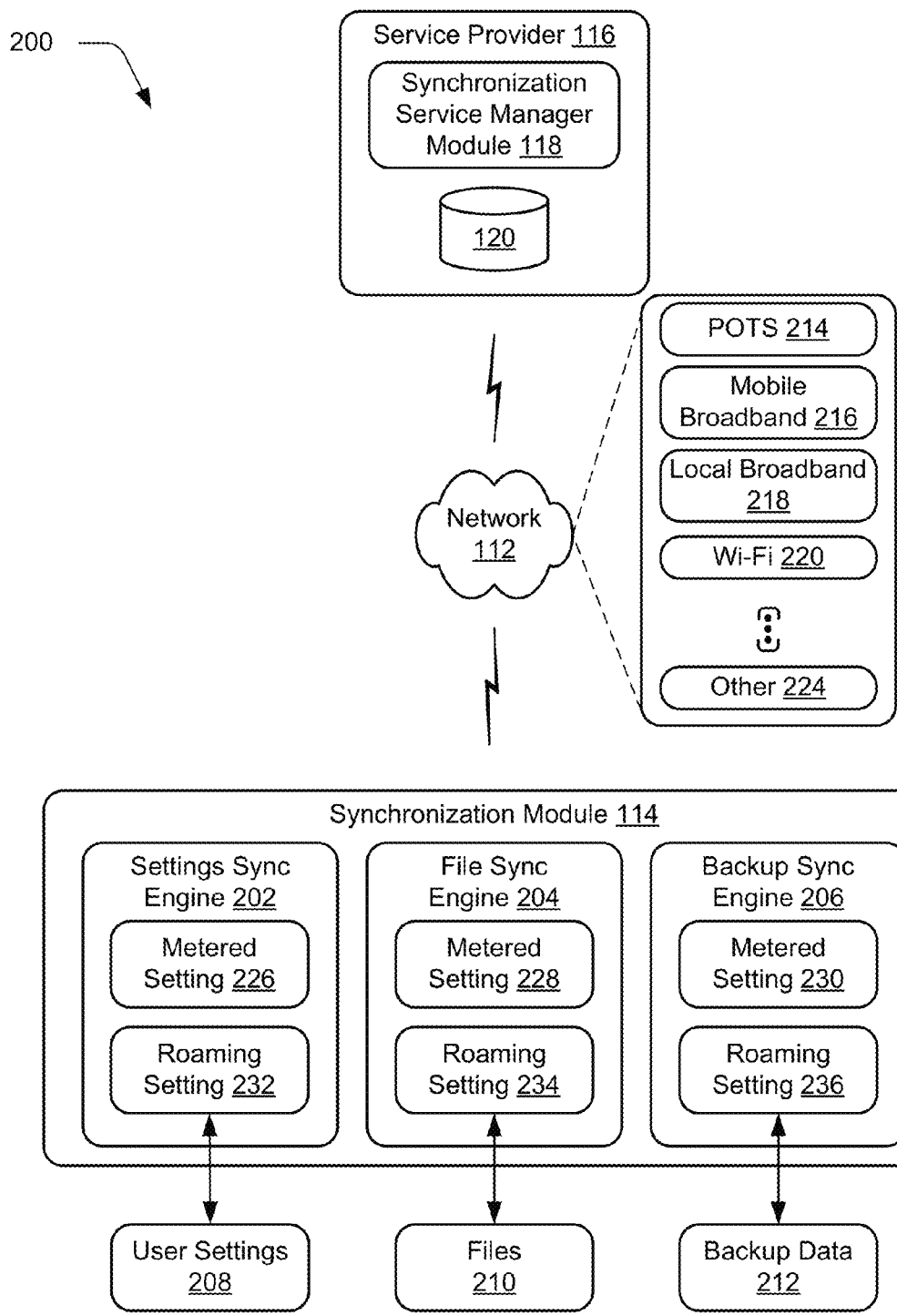
FIG. 2 illustrates a system in an example implementation of the computing device of FIG. 1 as showing a synchronization module in greater detail.

FIG. 2 illustrates a system 200 in an example implementation of the computing device 102 of FIG. 1 as showing the synchronization module 114 in greater detail. In this example, the synchronization module 114 is illustrated as including a plurality of synchronization engines (illustrated as "sync engines") that are representative of functionality to synchronize corresponding data. Examples of the engines include a settings sync engine 202, a file sync engine 204, and a backup sync engine 206. The settings sync engine 202 is representative of functionality to synchronize user settings 208, such as user settings for applications 110 (e.g., a browser, word processor), the operating system 108 (e.g., a background, arrangement of representations of applications 110), network passwords, and so on.

The file sync engine 204 is representative of functionality to synchronize files 210 over the network 112. The files 210, for instance, may be included in one or more collections of data (e.g., folders, files, and so on) specified by a user that are to be synchronized via the network 112. In this way, the files 210 may be "roamed" across the network 112 to storage 120 of computing devices of the service provider 116, other computing devices 122, and so on.

The backup sync engine 206 is representative of functionality to synchronize backup data 212 via the network, such as to store a backup to storage 120 of the service provider 116. This may include data of the applications 110 and/or identification of the applications, the operating system 108, and so on. For example, this backup may be performed by taking an "image" of the memory 106 of the computing device 102 which may be used to restore the computing device 102 in case of data corruption or other errors. Other examples of backup data are also contemplated without departing from the spirit and scope thereof.

As previously described, the network 112 used to support a network connection between the synchronization module 114 and the service provider 116 or other computing device may assume a variety of different configurations. Illustrated examples of which include a plain-old telephone system (POTS) 214, mobile broadband 216 (e.g., 3G, 4G, LTE, and other cellular networks), local broadband 218 (e.g., a local area network), Wi-Fi 220, and other 224 networks.

In some situations, the network 112 may have limitations in network access of the synchronization module 114 via the network 112 and thus the network 112 may be considered a "metered network" in such situations. A variety of different factors may be used to define whether a network connection is metered. For example, a metered network may involve cost (e.g., per usage, employ thresholds levels), bandwidth limitations, limitations based on time of access (e.g., time of day, day of week, etc.), and other factors and combinations thereof.

Therefore, a metered network (and characteristics of the metered network) may influence a user's choices regarding synchronization of different types of data in different ways. For example, a user may wish to keep files 210 "up-to-date" even in instances of a metered network (e.g., to keep work files current) but not wish to synchronize backup data 212 or user settings 208 in such situations. Accordingly, each of the settings sync engine 202, file sync engine 204, and backup sync engine 206 may include respective metered settings 226, 228, 230 that specify how synchronization performed by those engines is to be managed in instances of a metered network.

Further, roaming settings 232, 234, 236 may also be set to specify how access to the metered networks are to be managed based on additional characteristics of the metered network, such as whether the metered network supports roaming access in the current example. For example, a mobile broadband network may support different pricing and access structures between typical and roaming access. A network and corresponding network connection may be identified as metered in a variety of ways, an example of which is described as follows and shown in a corresponding figure.

Figure 3:
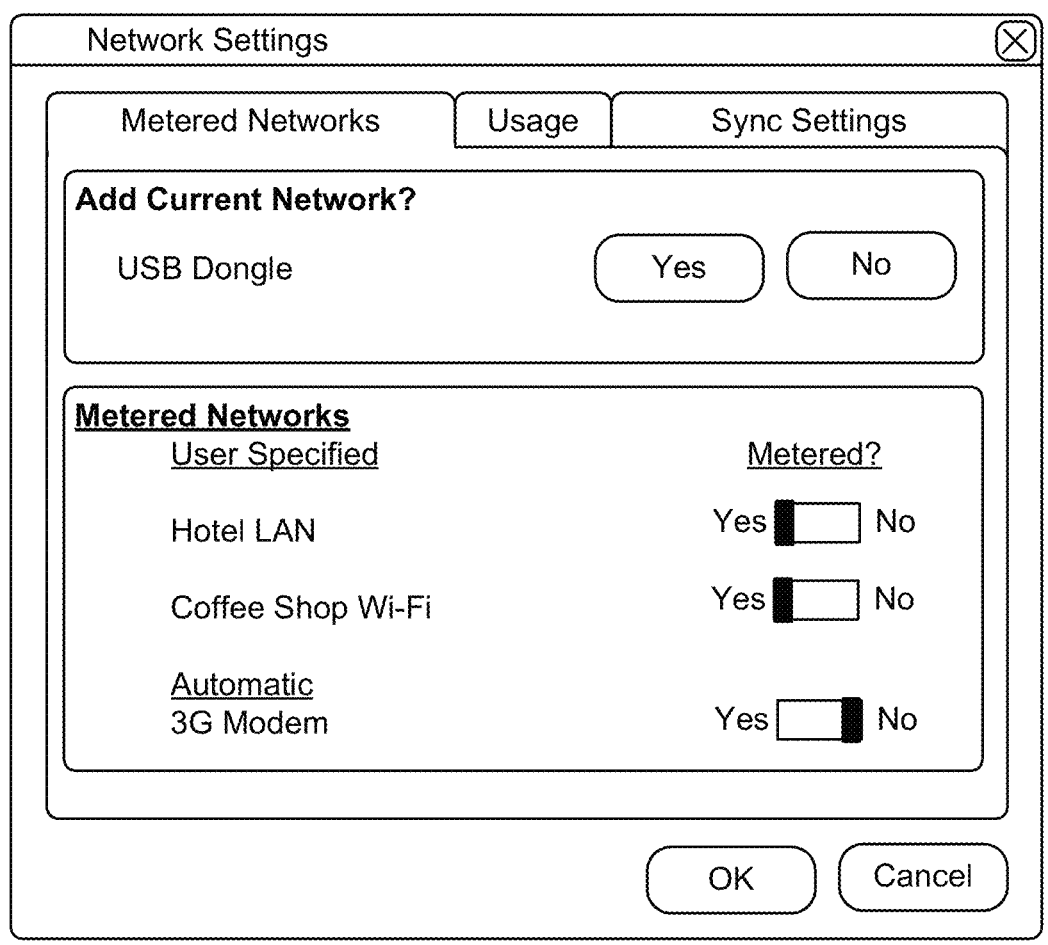
FIG. 3 depicts an example of a user interface that is configured to accept user inputs to identify a network and corresponding network connection as a metered network.

FIG. 3 depicts an example of a user interface 300 that is configured to accept user inputs to identify a network and corresponding network connection as a metered network. In this example, the user interface 300 includes an option to identify a network and corresponding network connection as a metered network. This may include an option to specify a hardware device that is associated with the network access as involving a metered network as illustrated.

This may also include an option to specify a current network connection as involving a metered network, which is also illustrated. For example, a user may access a hotel network that may involve time and bandwidth limitations. Therefore, a user may access the network and then specify that the current network is part of a metered network, such as part of identification of whether a network is private or public. In another example, a user may manually identify a network (e.g., a Wi-Fi access point of a coffee shop) as a metered network. A variety of other examples are also contemplated.

The synchronization module 114 may also include functionality to automatically identify a network or network connection as metered. This may be based on characteristics identified from the network and/or network connection itself, based on which device is used to access the network (e.g., a mobile broadband modem), and so on. Thus, a network and corresponding network connection may be identified as a metered network connection in a variety of ways.

In the illustrated example, the user interface 300 is further configured to support user verification of a metered network, which is illustrated through use of slider bars in the figure but other examples are also contemplated. For instance, the synchronization module 114 may automatically identify a network as a metered network and a user may then verify whether that is the case in the user interface 300. These identifications may then be leveraged as part of the management of the synchronization of data, an example of which is described as follows and shown in the corresponding figure.

Figure 4:
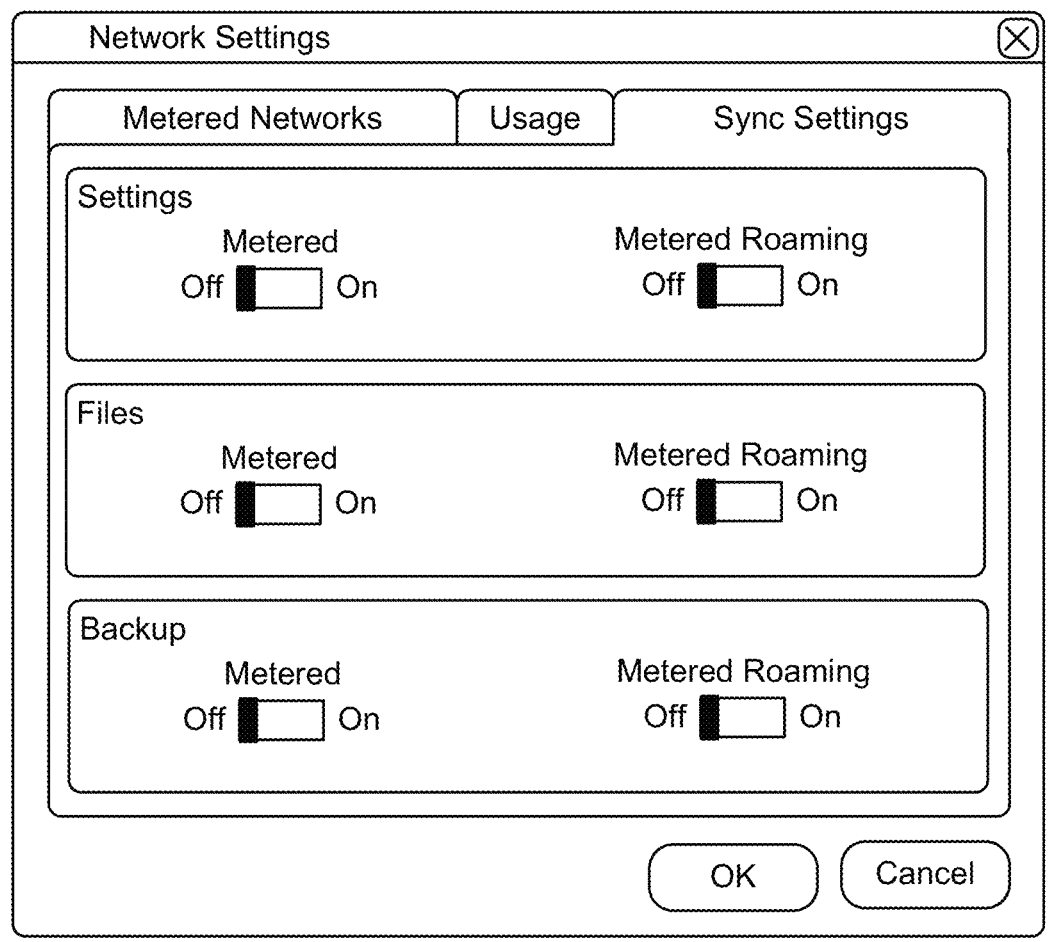
FIG. 4 depicts an example of a user interface that is configured to accept user inputs to specify settings for use in managing access to a network that has been identified as a metered network as described in relation to FIG. 3.

FIG. 4 depicts an example of a user interface 400 that is configured to accept user inputs to specify settings for use in managing access to a network that has been identified as a metered network as described in relation to FIG. 3. In this example, the user interface 400 includes options to specify settings to set whether synchronization is to be permitted over a metered network.

For example, options are provided to specify whether synchronization over a metered network is performed for settings, files, and backup data. Thus, each of these options corresponds to a respective one of the synchronization engines in FIG. 2. In this way, a user may specify different settings for different types of data.

Options are also provided to specify settings for particular characteristics of the metered network. In the illustrated example, an option is given for whether the metered network is a roaming metered network. Therefore, a user may specify whether synchronization is permitted for a metered network in general and specifically whether synchronization is permitted when the metered network is a roaming metered network.

In this example, the example settings are binary and thus describe whether synchronization "is" or "is not" permitted. Other examples are also contemplated. For instance, settings may be based on a particular time of day, day of week, available bandwidth, an overall threshold amount of data that is available, and so on.

The computing device, for example, may access a satellite network that has bandwidth limitations at particular times of day and an overall bandwidth limitation that is applied monthly. Settings may therefore be utilized to specify that backups are to occur at the "unlimited" times of day as long as the overall threshold has not been exceeded, whereas synchronization of files may occur at any time and settings are to occur at manually specified times. In this way, the identification of the metered network and corresponding settings may be used to manage access to a network by the synchronization engines, an example of which is described as follows and shown in a corresponding figure in the following section.

Example Procedures

The following discussion describes synchronization techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
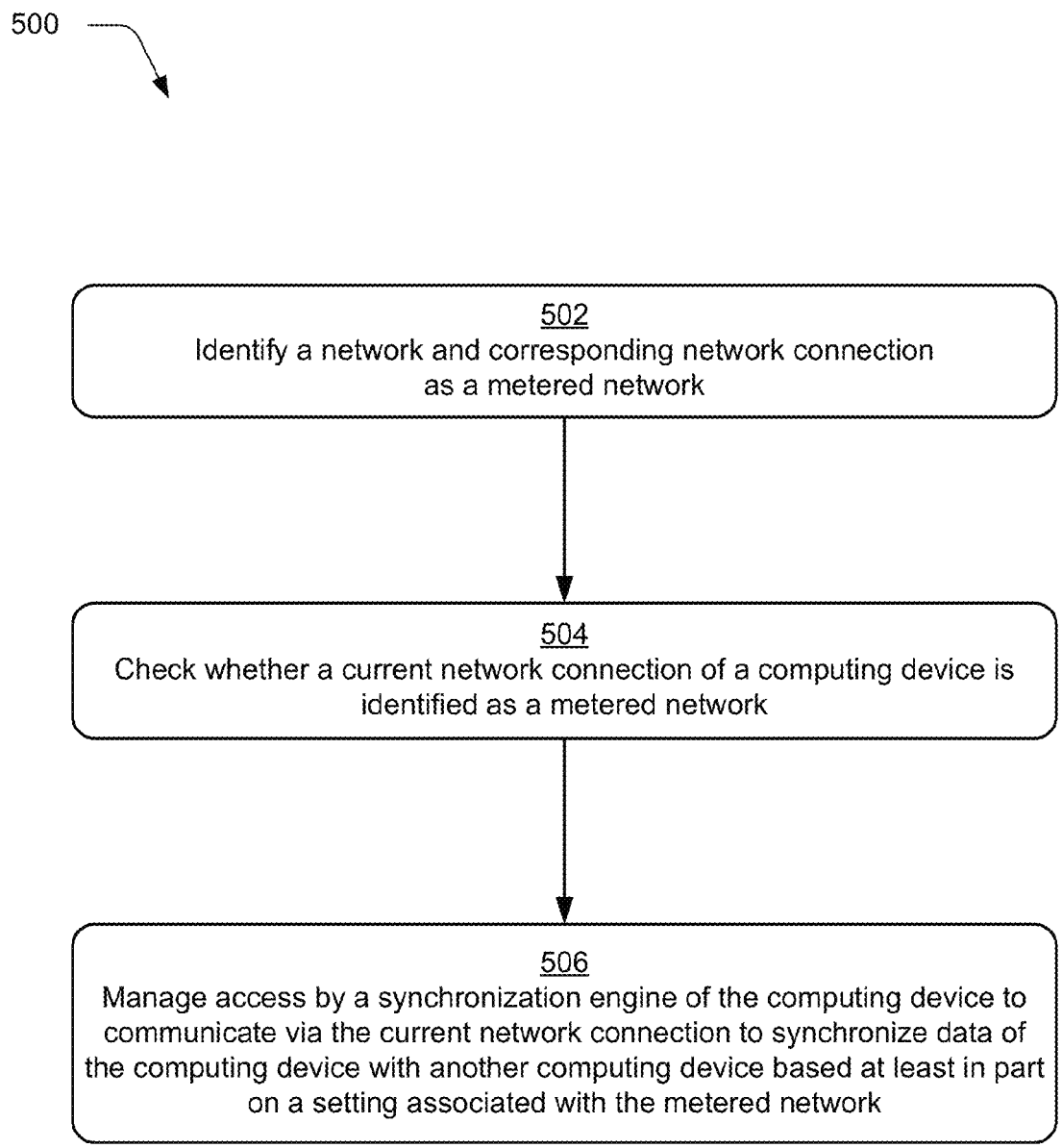
FIG. 5 is a flow diagram depicting a procedure in an example implementation in which a network is identified as a metered network and a setting is used at least in part to manage access of a synchronization engine to the network.

FIG. 5 depicts a procedure 500 in an example implementation in which a network is identified as a metered network and a setting is used at least in part to manage access of a synchronization engine to the network. A network and a corresponding network connection are identified as a metered network (block 502). For example, as shown in FIG. 3, a network connection may be identified as a metered network in a variety of ways, which may include manual and automatic techniques.

A current network connection of a computing device is checked to determine whether it is identified as a metered network (block 504). A synchronization module 114, for instance, may determine whether a current network connection that is to be initiated and/or has been initiated already by a computing device. This may include a comparison of a name of the network with a list of networks that have been identified as metered networks as described previously.

Access permitted by a synchronization engine of the computing device to communicate via the current network connection to synchronize data of the computing device with another computing device is managed based at least in part on a setting associated with the metered network (block 506). This may include whether to permit or restrict access, adjust access (e.g., throttling), and so forth. Further, these techniques may be leveraged for different synchronization engines such that different settings may be used for the different engines as previously described. An example of usage of the settings in the management of access by a synchronization engine is described as follows.

Figure 6:
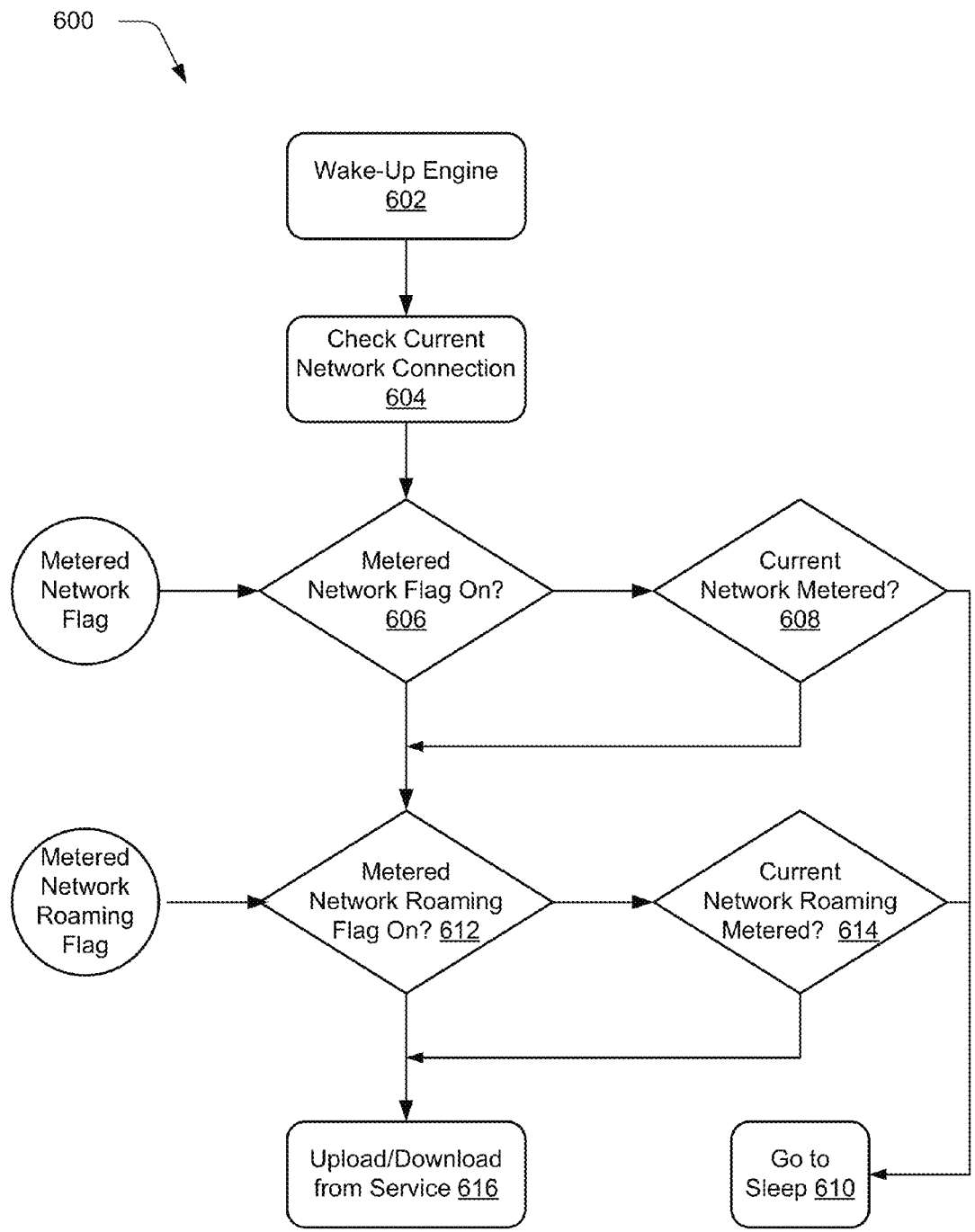
FIG. 6 is a flow diagram depicting a procedure in an example implementation in which settings for metered and metered roaming networks are used to manage network access permitted by a synchronization engine.

FIG. 6 depicts a procedure 600 in an example implementation in which settings for metered and metered roaming networks are used to manage network access permitted by a synchronization engine. A synchronization engine is woken (block 602), such as at a predetermined interval, particular point in time, and so on.

A current network connection is checked (block 604), such as to identify the network and corresponding network connection. A determination is made as to whether a metered network flag has been set (decision block 606). If so ("yes" from decision block 606), a determination is made as to whether the current network connection is metered (decision block 608). If so ("yes" from decision block 608), the access to the network is restricted and the synchronization engine returns to a sleep state (block 610).

If not ("no" from decision block 608), a determination is made as to whether a metered network roaming flag is set (decision block 612). If so ("yes" from decision block 612), a determination is made as to whether a current network has been identified as a roaming metered network (decision block 614). If so ("yes" from decision block 614), the access to the network is restricted and the synchronization engine returns to a sleep state (block 610). If not ("no" from decision block 614), upload/download from a service is permitted (block 616). A variety of other examples are also contemplated.

Example System and Device

Figure 7:
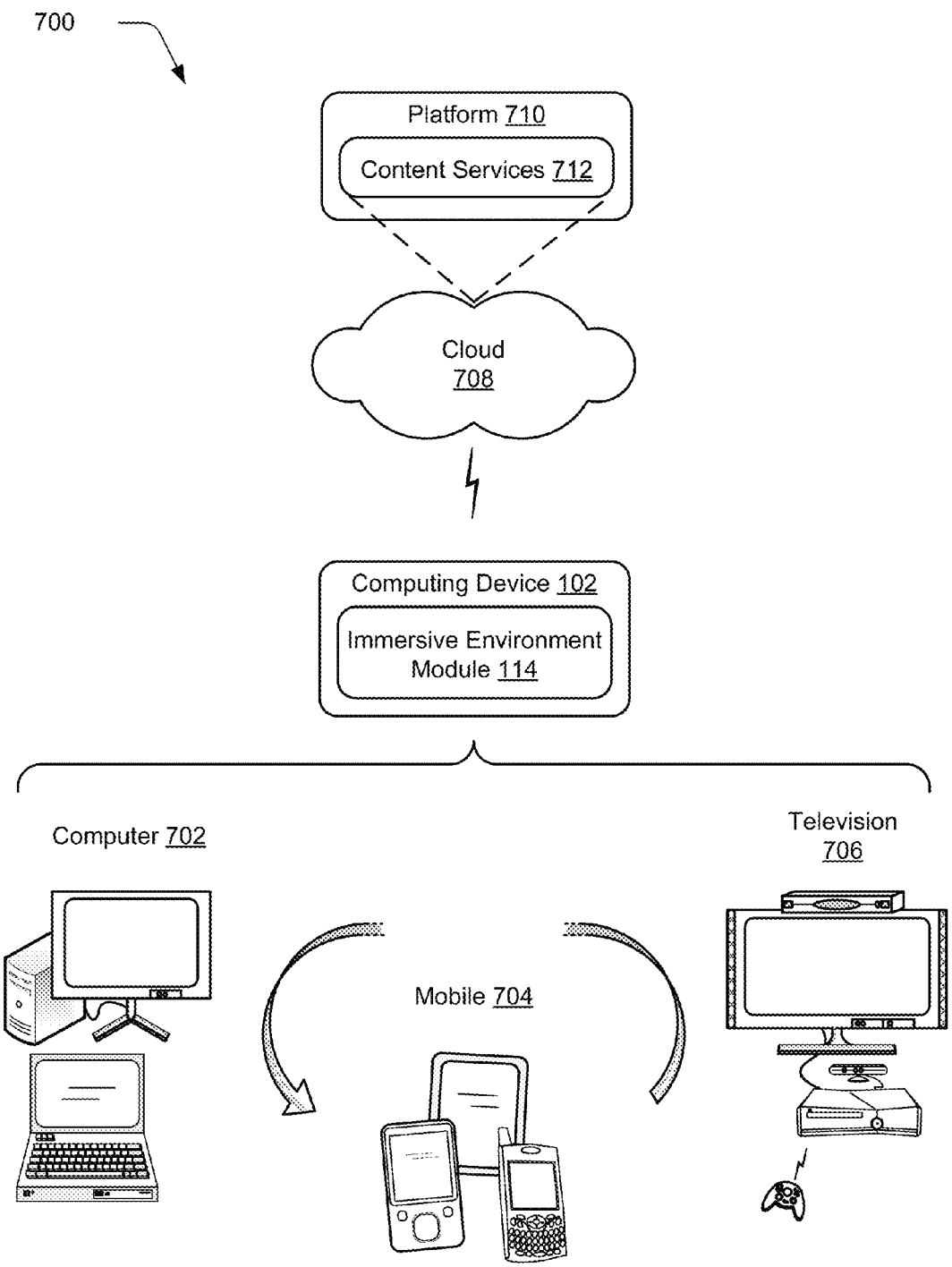
FIG. 7 illustrates an example system that includes the computing device as described with reference to FIG. 1.

FIG. 7 illustrates an example system 700 that includes the computing device 102 as described with reference to FIG. 1. The example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 702, mobile 704, and television 706 uses. Each of these configurations includes devices that may have generally different constructs and capabilities, and thus the computing device 102 may be configured according to one or more of the different device classes. For instance, the computing device 102 may be implemented as the computer 702 class of a device that includes a personal computer, desktop computer, a multi-screen computer, laptop computer, netbook, and so on.

The computing device 102 may also be implemented as the mobile 702 class of device that includes mobile devices, such as a mobile phone, portable music player, portable gaming device, a tablet computer, a multi-screen computer, and so on. The computing device 102 may also be implemented as the television 706 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. Thus, the computing device 102 is illustrated as including an immersive environment module 114 that may implement the techniques described herein.

The cloud 708 includes and/or is representative of a platform 710 for content services 712. The platform 710 abstracts underlying functionality of hardware (e.g., servers) and software resources of the cloud 708. The content services 712 may include applications and/or data that can be utilized while computer processing is executed on servers that are remote from the computing device 102. Content services 712 can be provided as a service over the Internet and/or through a subscriber network, such as a cellular or Wi-Fi network.

The platform 710 may abstract resources and functions to connect the computing device 102 with other computing devices. The platform 710 may also serve to abstract scaling of resources to provide a corresponding level of scale to encountered demand for the content services 712 that are implemented via the platform 710. Accordingly, in an interconnected device embodiment, implementation of functionality described herein may be distributed throughout the system 700. For example, the functionality may be implemented in part on the computing device 102 as well as via the platform 710 that abstracts the functionality of the cloud 708. In other words, the platform 710 may be utilized to implement all or a part of the functionality of the immersive environment module 114, e.g., this functionality may be distributed between the platform 710 and the computing device 102

Figure 8:
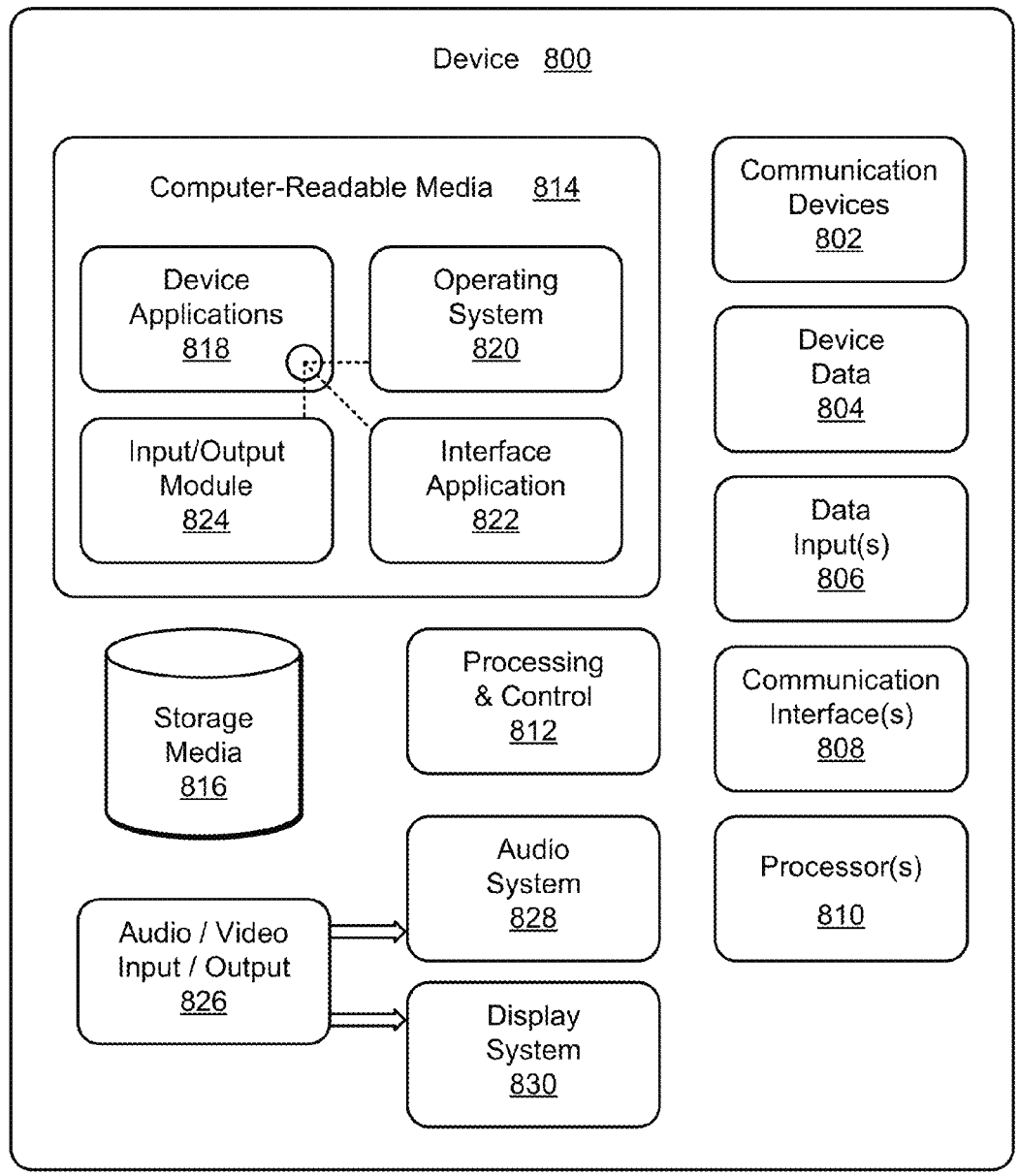
FIG. 8 illustrates various components of an example device that can be implemented as any type of computing device as described with reference to FIGS. 1-7 to implement embodiments of the techniques described herein.

FIG. 8 illustrates various components of an example device 800 that can be implemented as any type of computing device as described with reference to FIGS. 1, 2, and 16 to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein. In this example, the device applications 818 include an interface application 822 and an input/output module 824 (which may be the same or different as input/output module 114) that are shown as software modules and/or computer applications. The input/output module 824 is representative of software that is used to provide an interface with a device configured to capture inputs, such as a touchscreen, track pad, camera, microphone, and so on. Alternatively or in addition, the interface application 822 and the input/output module 824 can be implemented as hardware, software, firmware, or any combination thereof. Additionally, the input/output module 824 may be configured to support multiple input devices, such as separate devices to capture visual and audio inputs, respectively.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A computing device comprising:
one or more processors; and
one or more computer-readable storage media comprising instructions stored thereon that, when executed by the one or more processors, cause the one or more processors to implement a synchronization module,
the synchronization module being configured to:
synchronize user settings or files of the computing device and other backup data of the computing device with a cloud service using a current network connection;

access synchronization settings indicating that the user settings or files are designated for synchronization when the current network connection is metered and that the other backup data of the computing device is not designated for synchronization when the current network connection is metered;

detect that the current network connection has become metered; and responsive to detecting that the current network connection has become metered, cease synchronizing of the other backup data with the cloud service while continuing to synchronize the user settings or files with the cloud service over the current network connection;

wherein the synchronization module is further configured to:

periodically awake at a predetermined interval;

after awakening, check whether the current network connection has become metered;

when the current network connection has become metered, synchronize the user settings or files and not the other backup data with the cloud service;

when the current network connection has not become metered, synchronize the user settings or files and the other backup data with the cloud service; and return to sleep for the predetermined interval.

2. The computing device of claim 1, the current network connection having specified bandwidth limitations when metered.

3. The computing device of claim 1, the current network connection having associated costs when metered.

4. The computing device of claim 1, the current network connection being metered at specific times of day and not metered at other times of day, the other backup data being a memory image that is synchronized only at the other times of day.

5. The computing device of claim 4, the current network connection being a satellite network.

6. A method comprising:

accessing synchronization settings indicating that:
first data of a computing device is designated for backup when a current network connection of the computing device is roaming, and
second data of the computing device is not designated for backup when the current network connection of the computing device is roaming;

causing backup synchronization functionality of the computing device to periodically awaken at a predetermined interval;

when the backup synchronization functionality is awake, using the backup synchronization functionality to:
check whether the current network connection of the computing device is roaming;
when the current network connection is not roaming, synchronize the first data and the second data with a cloud service over the current network connection, the cloud service providing backup storage of the first data and the second data; and
when the current network connection is roaming, synchronize the first data and not the second data with the cloud service over the current network connection; and returning the backup synchronization functionality to sleep for the predetermined interval.

7. The method of claim 6, further comprising:
receiving user input designating the synchronization settings for the first data and the second data.

8. The method of claim 6, the first data comprising user settings for one or more applications of the computing device.

9. The method of claim 8, the second data comprising files of the computing device.

10. The method of claim 8, the second data comprising at least part of a backup memory image of the computing device.

11. The method of claim 6, further comprising:
determining whether the current network connection is roaming automatically and without user intervention.

12. The method of claim 6, the current network connection being a cellular connection.

13. The method of claim 6, the current network connection being a Wi-Fi connection.

14. A computing device comprising:
one or more processors; and
one or more computer-readable storage media comprising instructions stored thereon that, when executed by the one or more processors, cause the one or more processors to:
access synchronization settings indicating that:
first data of the computing device is designated for backup when a current network connection of the computing device is metered, and
second data of the computing device is not designated for backup when the current network connection of the computing device is metered;
cause a backup synchronization engine of the computing device to awaken at certain times;
when the backup synchronization engine is awake, use the backup synchronization engine to:
check whether the current network connection of the computing device is metered;
when the current network connection is not metered, synchronize the first data and the second data with a cloud service over the current network connection, the cloud service providing backup storage of the first data and the second data; and
when the current network connection is metered, synchronize the first data and not the second data with the cloud service over the current network connection; and
return the backup synchronization engine to sleep for a period of time before awakening the backup synchronization engine again.

15. The computing device of claim 14, the first data comprising files of the computing device.

16. The computing device of claim 15, the second data comprising a backup memory image of the computing device.

17. The computing device of claim 14, the first data comprising application settings and the second data comprising files.

18. The computing device of claim 14, the current network connection having associated bandwidth limitations when the current network connection is metered that are not present when the current network connection is not metered.

19. The computing device of claim 14, the current network connection having associated costs when the current network connection is metered that are not present when the current network connection is not metered.

20. The computing device of claim 14, embodied as a tablet or mobile phone.

* * * * *